United States Patent [19]

Oliver

[11] 4,259,660
[45] Mar. 31, 1981

[54] RETRACTABLE ROOF TOP SIGN FOR AUTOMOTIVE VEHICLES

[76] Inventor: Dorothy Oliver, 5614 N. Armenia Ave., Tampa, Fla. 33603

[21] Appl. No.: 949,399

[22] Filed: Oct. 10, 1978

[51] Int. Cl.³ ............................ G08B 3/00; G08B 5/36
[52] U.S. Cl. ...................................... 340/120; 340/84; 340/87; 340/135; 340/137; 40/592; 40/601; 116/40; 362/66; 362/71
[58] Field of Search .................. 340/120, 84, 87, 135, 340/123, 127, 107, 144, 145, 138, 137, 139, 141; 40/492, 529, 571, 592, 601; 116/40, 49, 51; 362/63, 65, 66, 71, 169, 178, 217, 218, 220, 294, 373

[56] References Cited

U.S. PATENT DOCUMENTS

| | | | |
|---|---|---|---|
| 2,836,914 | 6/1958 | Nelson et al. | 40/592 |
| 3,173,616 | 3/1965 | Lipscomb | 362/218 |
| 3,465,141 | 9/1969 | Schiffer | 362/294 |
| 3,579,184 | 5/1971 | Forestal | 340/87 |
| 3,622,980 | 11/1971 | Elledge | 340/87 |
| 3,761,890 | 9/1973 | Fritts et al. | 340/84 |
| 4,081,788 | 3/1978 | Gaspar | 340/84 |

*Primary Examiner*—John W. Caldwell, Jr.
*Assistant Examiner*—Donnie L. Grosland
*Attorney, Agent, or Firm*—Alfred E. Wilson

[57] ABSTRACT

A retractable roof top sign for automotive vehicles including a generally rectangular low profile frame for attachment to the roof of the vehicle and a sign structure transversely spanning the frame in pivotal attachment at a lower end between a pair of longitudinal side rails of the frame, a small gear motor being provided in driving connection to the sign in a manner so as to permit the sign to be selectively moved between a retracted position within the confines of the frame and a vertically erect position by operation of appropriate electric control switches mounted in the operator's compartment of the vehicle. For use in police cruisers or the like, an attention getting light flasher bar extends across the top width of the sign, and front an rear lights mounted within the confines of the frame are directed respectively on front and back messages displayed on the sign. A pair of oppositely directed longitudinally extending signs may be pivotally mounted along the respective side rails of the frame in a manner to cause their movement between retracted and elevated vertical positions in unison with the transverse sign.

9 Claims, 10 Drawing Figures

RETRACTABLE ROOF TOP SIGN FOR AUTOMOTIVE VEHICLES

BACKGROUND OF THE PRESENT INVENTION

The present invention pertains to a retractable roof top sign for automotive vehicles. It is particularly directed to vehicles used by law enforcement personnel. As is very well known, such vehicles are readily identifiable, even from substantial distances, by markings such as "Highway Patrol", "Sheriff", "Police", etc, as well as by the large roof mounted flasher lights or transverse flasher bars. Such lights or bars substantially alter the roof profiles and the general public has schooled itself to be constantly aware of the presence of such vehicles.

The use of unmarked vehicles by the law enforcement personnel has proven to be impractical because occupants of other vehicles particularly after dark, are hesitant to obey an order to "Stop", "Pull over" or the like when they are unable to identify either the vehicle or its occupants.

The main transverse sign is easily interchangeable in a frame with any of a variety of sign messages such as "Police", "Emergency", "slow down" "children", directional signs, etc., and in general police work, an officer can maintain a surprise advantage. For example, he may overtake a car in which the driver has commited a traffic violation, in a visably unmarked police car, and as he approaches the violator, the simple manipulation of switch means located in the driver compartment, on the dash board for example, will cause one or more official police signs to be erected with a flashing light bar.

In the sign retracted condition, the profile extends about two inches above the roof top and substantially blends into the contours thereof. In a modified form wherein the roof top is custom made with a recess sized for reception of the device, it will be completely invisible at a normal eye level.

The retractable roof top sign of the present invention is also applicable to many types of commercial vehicles such as taxi cabs, delivery vehicles and vehicles used for both business and private use, for example. In the retracted condition, the roof top structure presents a very low profile with the appearance of a roof top luggage rack and a person may use the vehicle as a family car without the identity of a commercial vehicle.

Therefore, one of the principal objects of the present invention is to provide a transverse roof top sign for a vehicle which is fully retractable from an exposed position to an inconspicuous position wherein it is not visible at a normal eye level to pedestrians or persons seated in other vehicles.

Another obvious object of the present invention is to provide a blinking flasher bar across the top of the transverse sign.

A further object of the invention is to provide a pair of longitudinally extending signs outwardly of the respective ends of the transverse sign which are operable by the movement of the transverse sign between retracted and upstanding positions.

Another object of the instant invention is to provide a small electric gear motor in driving connection to the main transverse sign with switch means in the vehicle driver's compartment for selective operation of the gear motor to move the transverse sign between retracted and upright positions.

A still further object of the present invention is to provide front and rear light means directed on front and rear surfaces of the main transverse sign and electric switch means located adjacent to the gear motor switches in the driver's compartment.

Yet another object of the instant invention is to provide a plurality of easily interchangeable signs for fixed insertion into the main transverse sign frames.

DETAILED DESCRIPTION OF A PREFERRED EMBODIMENT

Figure 1:
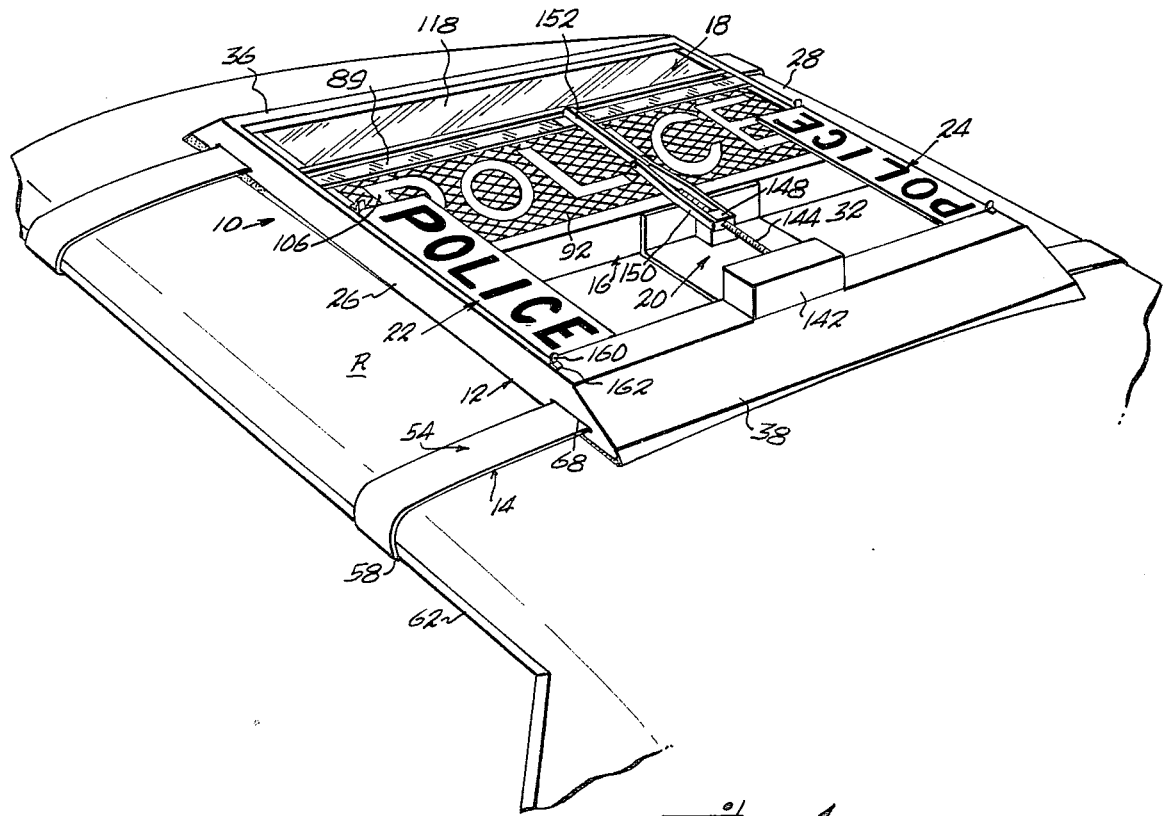
FIG. 1 is a fragmentary perspective view of the roof portion of an automobile vehicle illustrating the roof top sign structure of the present invention with the signs thereof in fully retracted position within the confines of a main frame fixed to the exterior surface of the vehicle roof.

With reference to the drawings in which like reference characters designate like or corresponding elements throughout the various view, and with particular reference to FIG. 1 the retractable sign structure of the present invention, designated generally at 10, includes a generally rectangular frame 12 with attachment means 14 to the top of the vehicle roof R. The sign structure further includes a main transverse sign holder and sign assembly 16 with an upper flasher bar 18 drive means generlly indicated at 20 serves to move the sign holder and flasher bar assembly 16 from the retracted position of FIG. 1 to the vertically extended position of FIG. 2.

Figure 2:
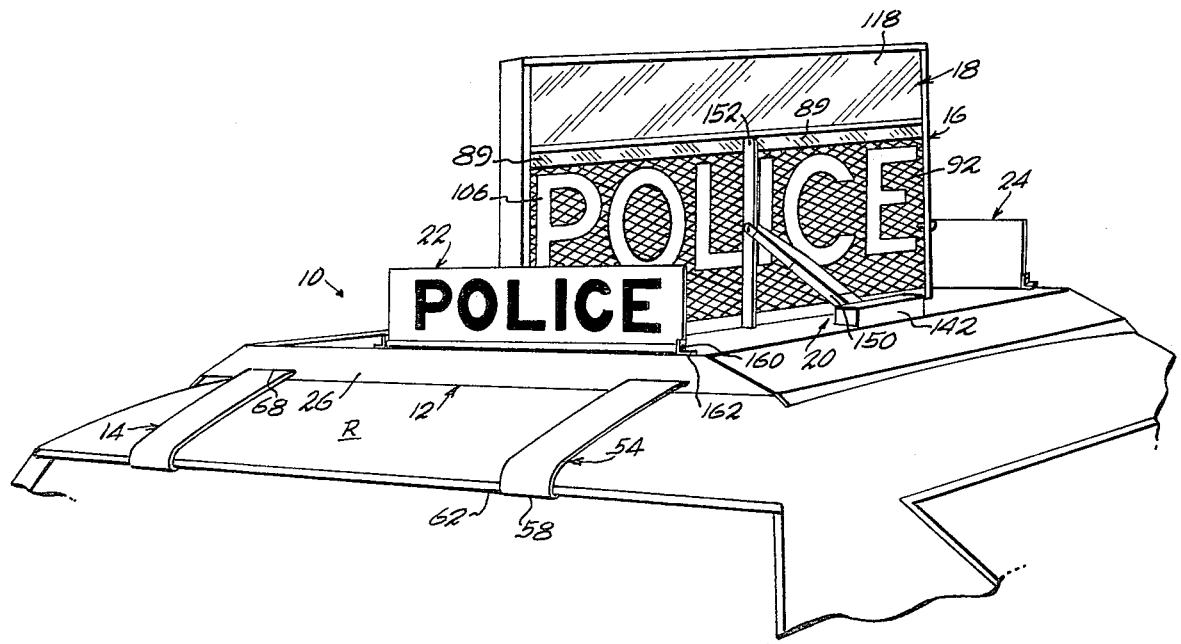
FIG. 2 is a perspective view similar to FIG. 1 with the signs in generally upright or erected positions.

A pair of opposed signs designated generally at 22, 24 are positioned outwardly of the respective side edges of the main transverse sign assembly 16 and are automatically movable between the retracted and upright positions of FIGS. 1 and 2 by the movements of the transverse sign assembly 16 in a manner to be subsequently described.

Figure 5:
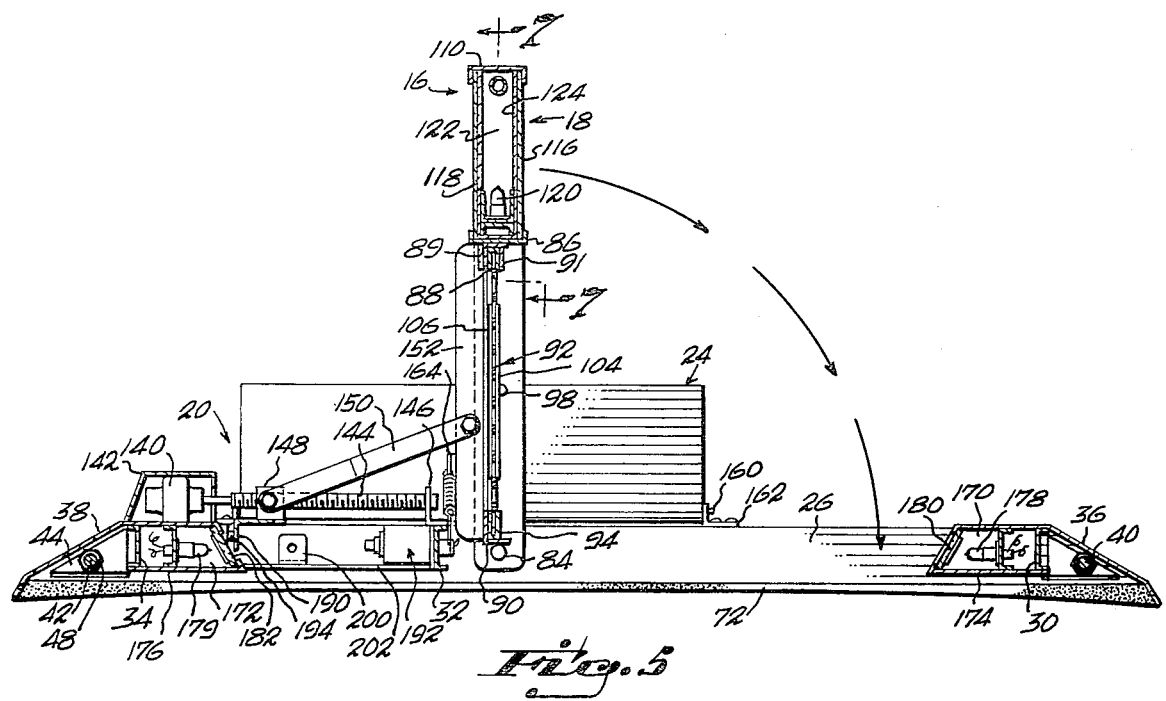
FIG. 5 is a longitudinal vertical sectional view taken generally along the line 5—5 of FIG. 4.
Figure 4:
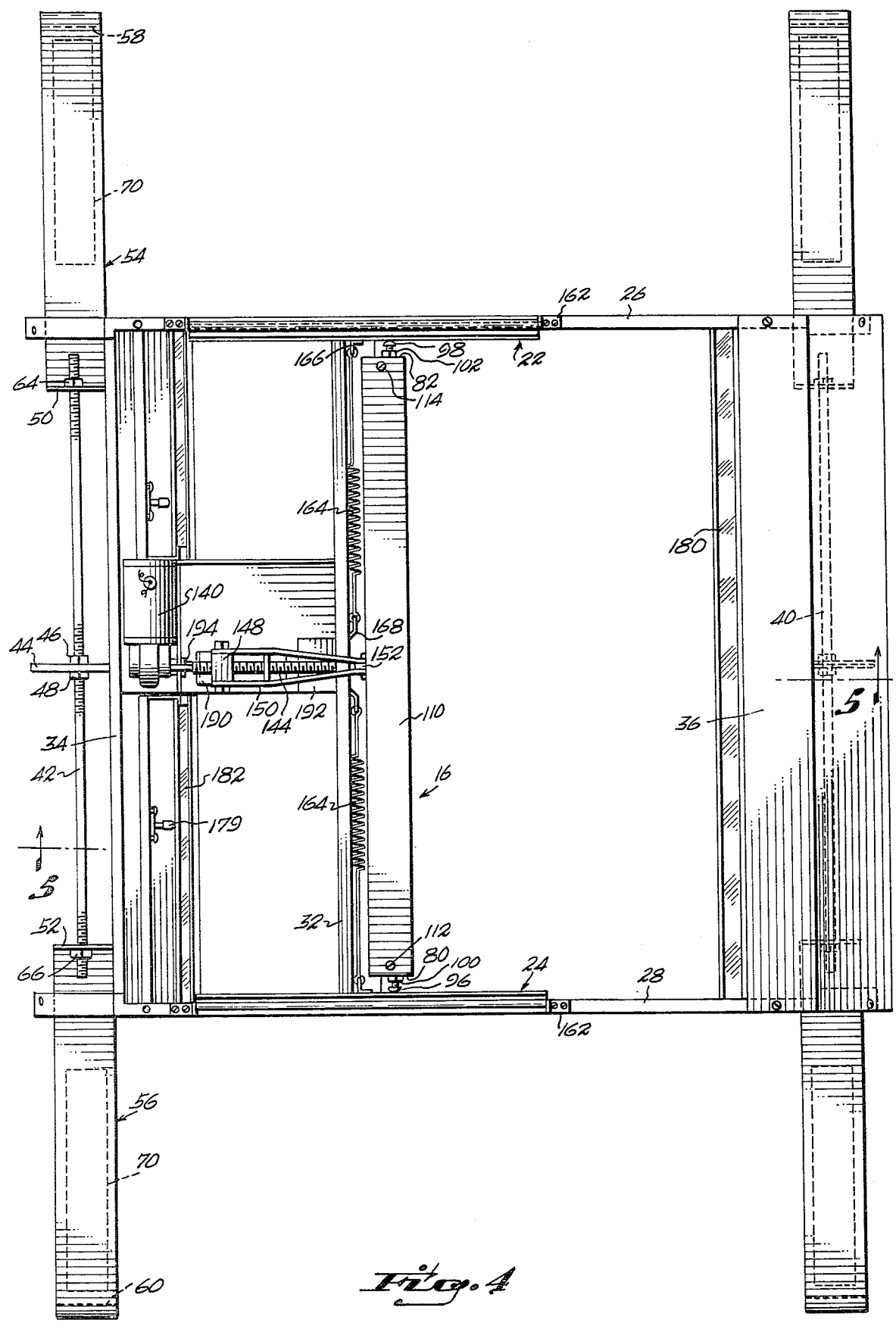
FIG. 4 is a top plan view of the sign structure as seen in FIG. 2 with a forward cover plate removed to better illustrate the operation thereof.

With particular reference to FIGS. 4 and 5, the main frame 12 includes a pair of spaced apart side rails 26, 28 in a fixed connection by a plurality of transverse rails such as 30, 32 and 34, and front and rear end cover members 36 and 38. Elongated front and rear screw rods 40, 42 are provided beneath cover member 36, 38. Each screw rod 40, 42 is adjustably fixed centrally to a finger 44, fixed to and extending outwardly from one of the transverse rails such as 34 by a pair of lock nuts 46, 48. The opposed outer ends of each screw rod 40, 42 extend through upturned flanges 50, 52 of a pair of flexible attachment arms 54, 56 which include outer end hooks 58, 60 for engagement with the respective side gutters 62 conventionally provided along the two sides of an automotive vehicle roof. The arms 54, 56 are drawn into locking engagement with the gutters 62 by a pair of nuts 64, 66 engaged on the opposed end portions of each screw rod 40, 42 for engagement against flanges 50, 52 arms 54, 56 extend through slots such as 68 FIGS. 1 and 2 in side rails 26, 28. All members such as side rails 26, 28 arms 54, 56 which normally contact the vehicle roof R are insulated as by a synthetic foam material as at 70, 72, FIGS. 4 and 5.

Figure 7:
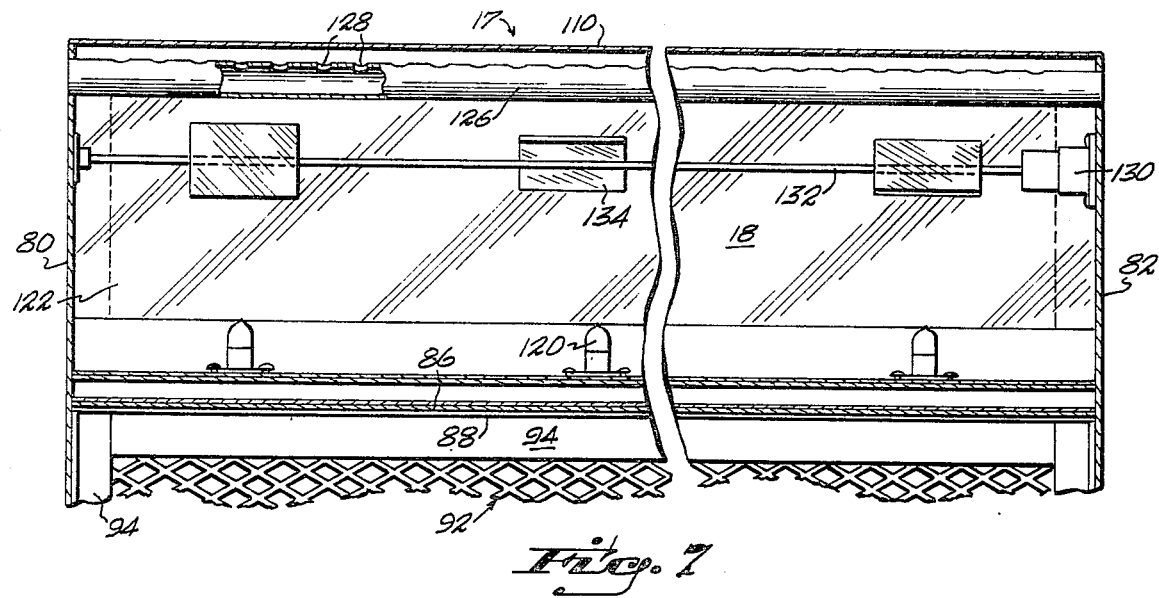
FIG. 7 is a fragmentary vertical transverse view taken along line 7—7 of FIG. 5.

With particular reference to FIGS. 4, 5 and 7 the main transverse sign and flasher bar assembly 16 is comprised of a pair of side plates 80, 82 pivotally attached at their lower ends as at 84, FIG. 5, between side rails 26, 28. An intermediate channel member 86 is fixed between side plates 80, 82 as is a rectangular sign support frame, formed of angle members such as 88, 90. A top reflector strips 89 may be adhesively secured along the top angle member 88. The main body of the sign 92, preferably formed of an open work material such as expanded metal to reduce wind resistance, is bounded by a peripheral frame 94 sized for reception in the angle member 88, 90. A top reflector strip 91 may be secured to the front face of the top portion of frame 94. A pair of set screws 96,98 with respective lock nuts 100, 102 are threaded through the side plates 80, 82 to engage behind the upright portions of sign frame 94 to hold said sign in the peripheral angle member 88, 90.

Sign letters 104, 106 are secured on both sides of the expanded metal 92 in any convenient manner such a by a suitable adhesive materials. In the drawings the word P O L I C E is used for illustration purposes and in this instance the word may be reversed on the front side of the sign to read properly in the rear view mirror of a car in front of the police vehicle. Any number of signs, providing different messages may be provided and interchanged by simply unscrewing the set screws 92, 98, removing one sign, replacing it with a second sign and reengaging screws 96, 98.

The flasher bar 18 is diposed above transverse channel member 86 and is provided with a top cover 110 spanning the distance between the top ends of side plate 80, 82 and being removably fixed thereto by screws 112, 114. Front and back lenses 116, 118 are provided in the defined opening and a plurality of light bulbs 120, five, for example, are mounted within the flash bar chamber 122. The lenses may be of any desired color to suit the occassion and may have a textured inside surface or textured inserts as illustrated at 124 to enhance the visual effects of the blinking lights.

A breathing tube 126 is provided across the top ends of side plates 80, 82. A plurality of holes 128 are provided in the top of tube 126 to dissipate the heat from the chamber 122, while preventing the entrance of moisture.

In a modified form FIG. 7, a small gear motor 130 may be mounted to one end plate 82, to rotate a transverse shaft 132 with one reflective plate 134 fixed thereto for each light bulb 120, which are preferably of the quartz type, to further inhance the flashing effect of the blinking lights 120.

A gear motor 140, fixed within a housing 142 atop rear cover plate 38, drives a forwardly extending screw rod 144, journalled at its forward end in an angle bracket 146 fixed atop transverse rail 32. A traveling nut 148, threaded on screw rod 144 is pivotally linked at 150 to a control vertical bar 152 fixed between the top and bottom members 88, 90 of the sign support frame. Motor 140, therefore, when selectively operated in forward and reverse directions, serves to raise or retract the main transverse sign assembly 16.

With particular reference to FIGS. 1, 2, 4 and 5, each of the side longitudinal signs 22, 24 is pivotally hinged on a pin 160 carried between pairs of angle brackets 162 fixed to the top of one side rail such as 26. Each side sign 22, 24 is normally tensioned to the down position of FIG. 1 by a tension spring 164 connected between a bracket 166 fixed thereto and a bracket 168 fixed to frame member 32. As seen in FIG. 1, side signs 22, 24 partially lie atop the transverse sign 16. Therefore, when sign 16 is pivoted upwardly as above described, it automatically pivots the side signs 22, 24 to the positions of FIG. 2. As best been in FIG. 4, the rounded heads of set screws 96, 98 bear against the back surface of signs 22, 24 in the ir upright positions and when the main sign structure 16 is retracted, the side signs 22, 24 follow along under the influence of tension springs 164 to the retracted positions of FIG. 1.

Front and rear light chambers 170, 172 are defined by cover plates 36, 38, transverse rails 30, 34 and bottom plates 174, 176. A plurality of light bulbs 178 and 179 preferably of the quartz variety are mounted in each of the light chambers 170, 172, with lenses 180, 182, mounted therein, directed toward the front and rear surfaces of the transverse sign 16.

Figure 3:
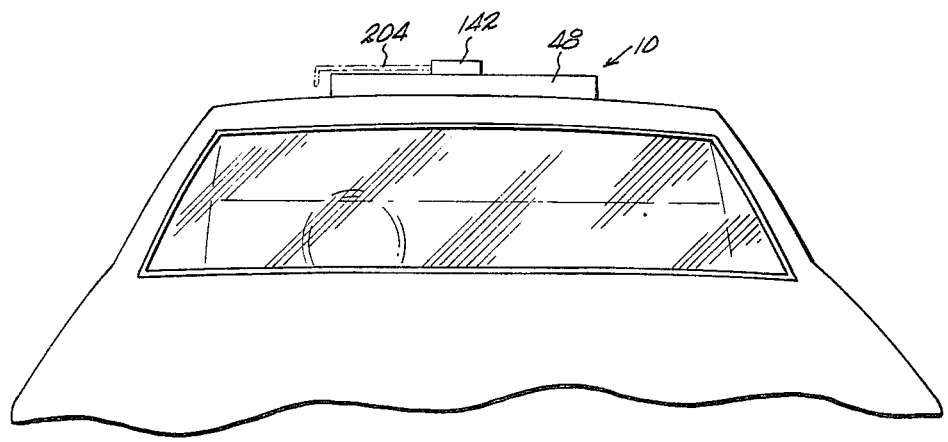
FIG. 3 is a rear view of a vehicle with the roof top sign structure of the present invention in a retracted condition and mounted atop the roof of the vehicle to better illustrate the low profile thereof with the appearance of a luggage carrier.
Figure 10:
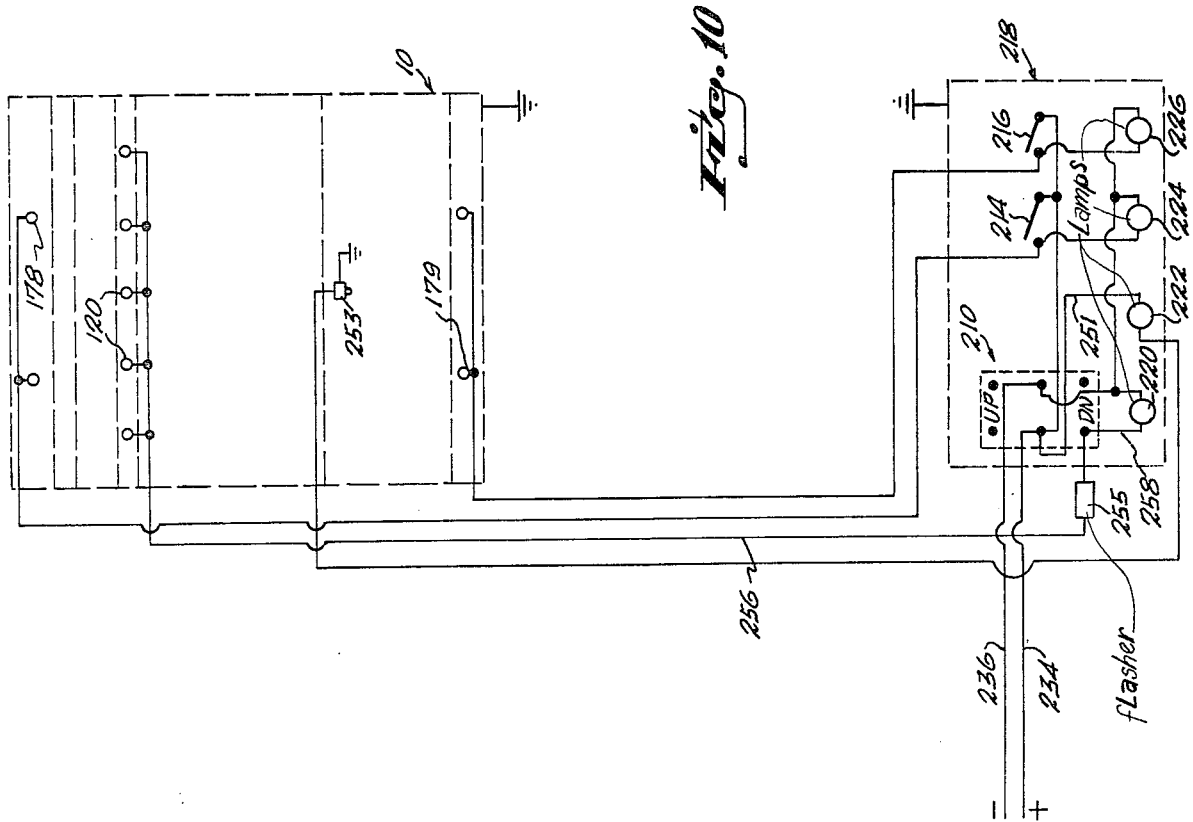
FIG. 10 is an electrical schematic view of the lights and control switches of the sign device.
Figure 9:
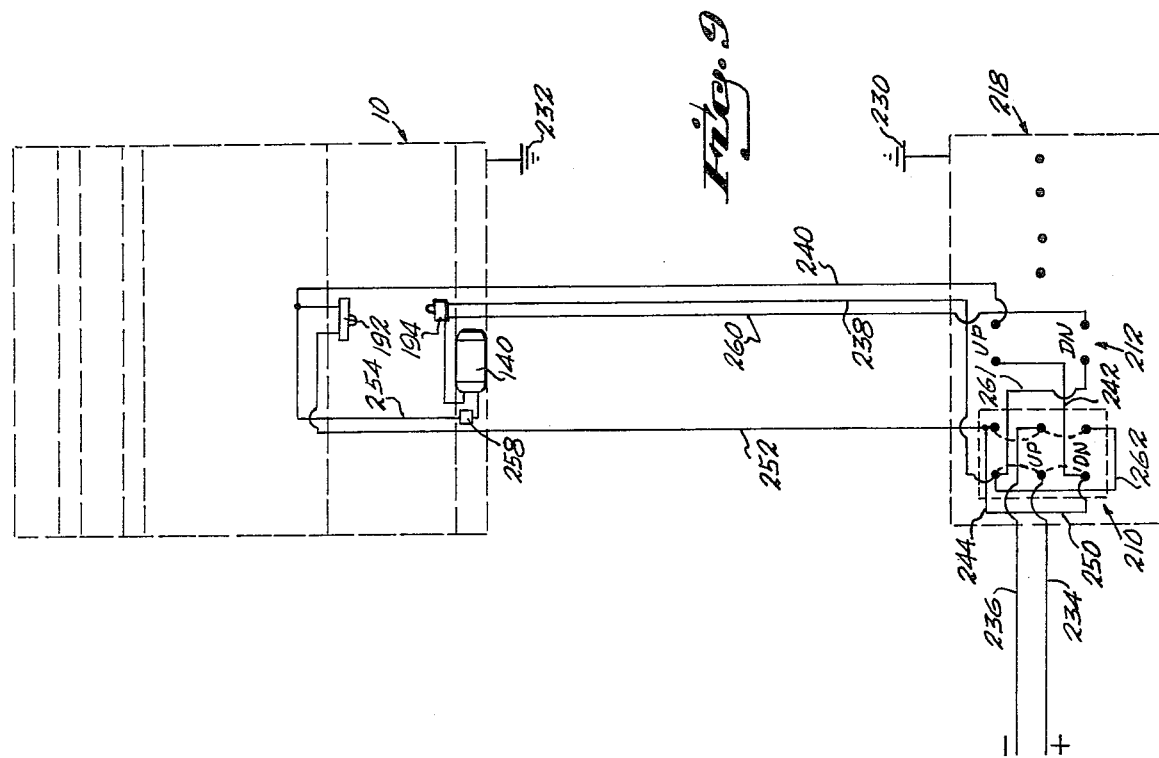
FIG. 9 is a electrical schematic view of the motor control switch means of the present invention.

With reference to FIG. 5, an angle bracket 190 fixed to the traveling nut is positioned to respectively engage limit switch means, generally indicated at 192 and 194, when the sign 16 is fully raised and retracted as will be more fully described relative to the electical diagrams, FIGS. 9 and 10. A clevis 200 is fixed to a plate 202 in a position to be fixedly engaged by the link 150 to maintain the sign 16 in its upright altitude in event of motor failure, or, alternatively, as seen in FIG. 3, a tool 204 may be inserted through the motor housing 142 into a suitable socket, for example, in the rotor to operate the sign between the retracted and extended attitudes.

Figure 6:
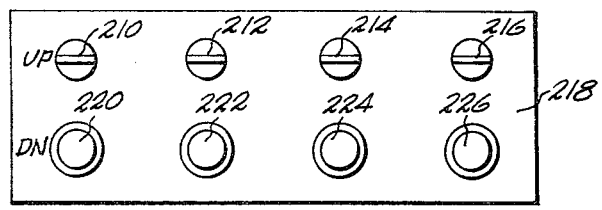
FIG. 6 is a front plan view of a typical switch control box for mounting in the operators compartment of a vehicle.

FIG. 6 illustrates four toggle type switches 210, 212, 214 and 216 in a control box 218 for mounting in the drivers compartment of the vehicle, on the dashboard for example. The circuits for the respective switches 210 through 216 include the indicator lights 220, 222, 224 and 226.

With particular reference to FIGS. 9 and 10, the electric circuitry will be described relative to the gear motor up-down control switch 210 and the push starter switch 212. When switches 210 and 212 are simultaneously moved to up positions a circuit it completed from positive lead 234 from the vehicle battery through switch 210, lead 238, limit switch 194, gear motor 140, leads 254 and 240, switch 212 leads 242, 244 and switch 210 to negative battery lead 236. When the sign is fully erected the circuit is broken by limit switch 194.

When the control and starter switches 210 and 212 are simultaneously moved down, the circuit is reversed through leads 250 and 252, limit switch 192, lead 254, circuit breaker 258, gear motor 140, lead 260, switch 212, leads 261, 262, and switch 210 to negative lead 236. The switch control box 218 and sign assembly 10 are grounded as at 230 and 232.

When the sign 16 is elevated, a circuit is completed to indicator light 222 on the control box. This circuit is completed from lead 234, FIG. 10, lead 251 to indicator light 222, to the grounded limit switch 253.

Movement of the control switch 210 to the down position, FIG. 10, completes a circuit to the flasher bar bulbs 120 through the flasher switch 255 and lead 256. The flasher indicator light 220 is energized through leads 258 and 236.

On-off switches 214 and 216 respectively energize the front and rear lights 178, 179 and the indicator lights 224, 226 in the control box 218 are in respective series therewith.

When the switch 212 is moved to the down positions, the gear motor 140 is reversed as above described to retract the sign structure 16, and the circuit to the indicator light 222 is broken at limit switch 253.

Figure 8:
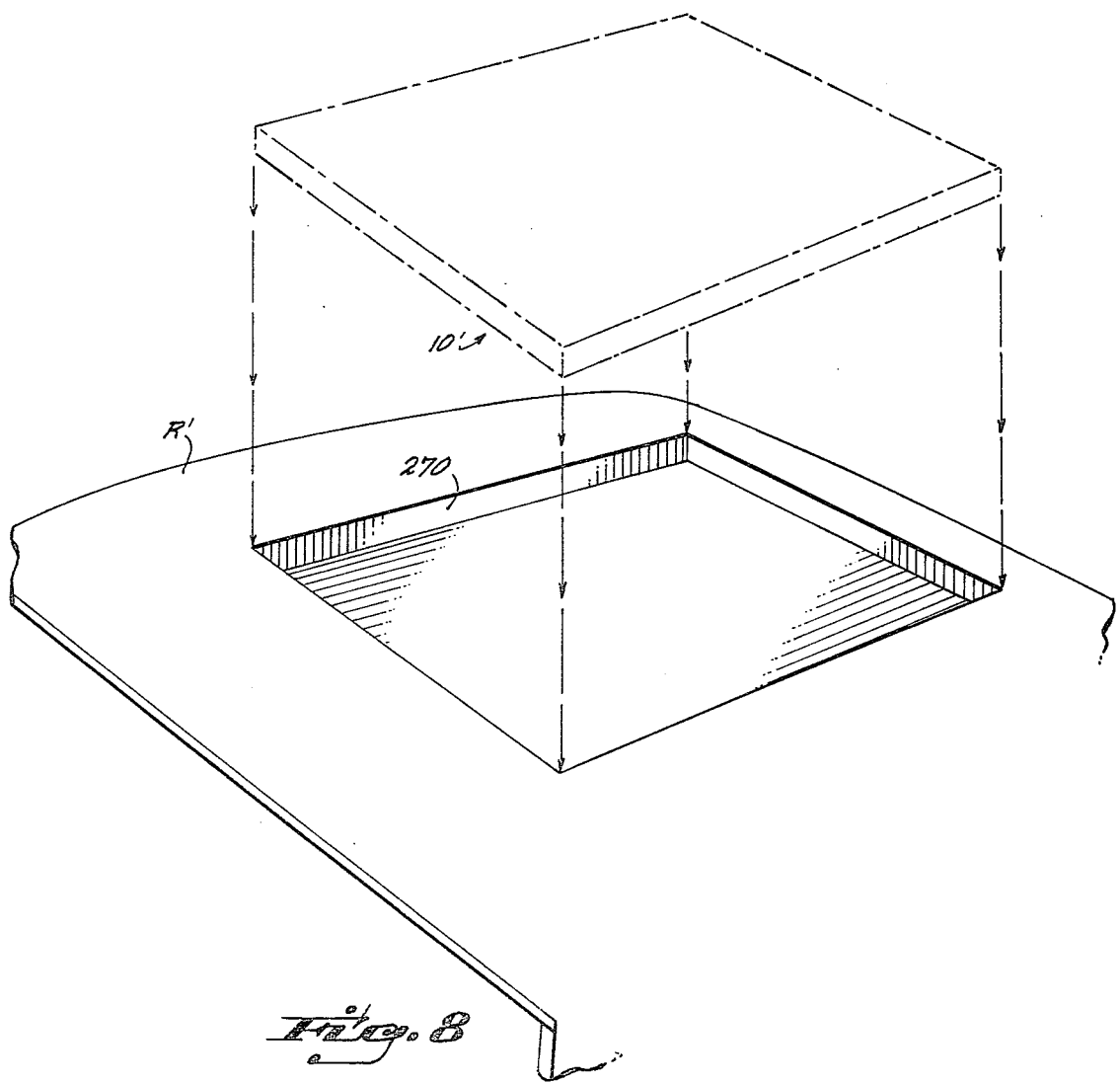
FIG. 8 is a generally schematic illustration of a modified form of the invention.

FIG. 8 is a view similar to FIG. 1 illustrating a car roof R' with a recess 270 therein sized to receive the sign structure designated schematically at 10' in an exploded relation thereto. The recess is sized to receive the sign structure in a manner whereby the top side thereof substantially defines a continuation of the vehicle's normal roof line.

I claim:

1. A roof top traffic control sign device for mounting on the roof of an automotive vehicle comprising, a main peripheral frame including a pair of spaced apart side rails and front and back transverse end rails connecting between respective pairs of end portions of said side rails, a transverse message carrying sign assembly pivotally spanning a central open area defined by said side, front and back rails, means to pivotally operate said transverse sign between a retracted horizontal position lying within the confines of said central area and a generally upright position whereby front and back surface areas provided on said sign assembly and carrying said messages are exposed for viewing purposes, remote control means located within the drivers compartment of the vehicle for selective operation of said sign between said retracted and upright positions, a longitudinally extending message carrying sign pivotally supported along each of said side rails, linkage means whereby said longitudinally extending sign plates are pivoted between upright and retracted positions in response to like movement of said transverse sign and means to attach said sign device to the roof of a vehicle.

2. The roof top sign as defined in claim 1 including front and back light producing means connected to the vehicle's battery, in respective front and back chambers, spanning said central open area respectively adjacent to said front and back rails, and including lens means directing the light on said front and back surface areas.

3. The roof top sign as defined in claim 2 including remote control switch means for selective operation of said light producing means, comprising at least one light bulb in each of said front and back chambers.

4. The roof top sign as defined in claim 1 wherein said means to attach comprises front and back pairs of oppositely extending flexible arms, each arm including a hooked distal end portion to engage an existing side gutter of the vehicle, each pair including inner end portions extending through slots in the respective side rails and including draw means fixed to one of said end rails and adjustably connected to opposed inner ends of said pair to secure said hooked end portions relative to the vehicle gutters.

5. The roof top sign as defined in claim 4 wherein said adjustable draw means comprises an elongated screw rod, each end of which extends through a hole in an upturned end of one of said arms with a draw hold engaged on said screw rod outwardly of said upturned end.

6. The roof top sign as defined in claim 1 wherein said means to pivotally operate comprises a reversable electric gear motor mounted centrally relative to said rear end rail, a forwardly extending screw rod driven by said motor, a traveling nut threaded on said screw rod and a link pivotally connected between said nut and said sign assembly.

7. The roof top sign as defined in claim 6 wherein said remote control means includes electric switch means interposed in electric circuit means connecting between said gear motor and the vehicle battery.

8. The roof top sign as defined in claim 6 including limit switch means in said circuit means to stop motor at predetermined limits of said pivotal movement.

9. The roof top sign as defined in claim 6 including a tool for insertion into a companionate socket fromed in the rotor shaft of said gear motor to operate said sign assembly to or from an upright position in event of motor failure.

* * * * *